United States Patent
Voorwinden

(10) Patent No.: US 7,482,781 B2
(45) Date of Patent: Jan. 27, 2009

(54) CONTROLLING POWER SUPPLY BETWEEN A VOLTAGE GENERATOR, A LOAD AND A RECHARGEABLE BATTERY

(75) Inventor: Cor Voorwinden, Toulouse (NL)

(73) Assignee: Freescale Semiconductor, Inc., Austin, TX (US)

( * ) Notice: Subject to any disclaimer, the term of this patent is extended or adjusted under 35 U.S.C. 154(b) by 150 days.

(21) Appl. No.: 10/595,228

(22) PCT Filed: Sep. 29, 2004

(86) PCT No.: PCT/EP2004/010875

§ 371 (c)(1), (2), (4) Date: Jul. 13, 2006

(87) PCT Pub. No.: WO2005/039015

PCT Pub. Date: Apr. 28, 2005

(65) Prior Publication Data

US 2007/0063674 A1    Mar. 22, 2007

(30) Foreign Application Priority Data

Sep. 30, 2003    (EP) .................................. 03292409

(51) Int. Cl.
H01M 10/46    (2006.01)
(52) U.S. Cl. ..................................................... 320/107

(58) Field of Classification Search .................. 320/107, 320/114, 128, 140
See application file for complete search history.

(56) References Cited

U.S. PATENT DOCUMENTS 6,002,220 A    12/1999    Takahashi et al.
2002/0135235 A1    9/2002    Winick et al.

FOREIGN PATENT DOCUMENTS

EP    0695017 A2    1/1996
GB    2243961 A    11/1991

*Primary Examiner*—Edward Tso

(57) ABSTRACT

Power supply apparatus, especially for the active circuits of a portable radio communication device. The power supply supplies a direct voltage to a load that is connected to a first terminal, is comprising a rechargeable battery for connection to a second terminal, and a voltage generator for recharging the battery and supplying power to the load. The power supply includes first control means for controlledly supplying current from the voltage generator to the first terminal so as to control supply of current from the voltage generator to the load and for preventing reverse flow of current from the first terminal to the voltage generator, and second control means for controlledly supplying current between the first and second terminals so as to control supply of current from the voltage generator through the first control means to the battery and from the battery to the load.

20 Claims, 3 Drawing Sheets

|  | NO CHARGER PRESENT | LOW POWER CHARGER PRESENT CAN SUPPLY APPLICATION IN LOW CURRENT MODES | HIGH POWER CHARGER PRESENT CAN SUPPLY APPLICATION IN ALL MODES |
|---|---|---|---|
| NO BATTERY | A | C | |
| DEPLETED BATTERY | B | D TRICKLE | |
| LOW / NORMAL BATTERY | | E | F FULL RATE |
| BATTERY TOP OFF | | G TOP OFF | H FINAL TOP OFF |
| BATTERY FULL | | I | J |

CONTROLLING POWER SUPPLY BETWEEN A VOLTAGE GENERATOR, A LOAD AND A RECHARGEABLE BATTERY

FIELD OF THE INVENTION

This invention relates to power supply apparatus for supplying a direct voltage to a load and comprising a rechargeable battery and a voltage generator for recharging the battery and supplying power to the load,.

BACKGROUND OF THE INVENTION

Rechargeable batteries are used in many circumstances to power user devices, especially radio communication apparatus such as portable telephones, for example. A charger comprising a voltage generator is provided to recharge the battery. The charger may take the form of an AC/DC converter or a DC/DC transformer, for example.

The charger is often connectable to the user device with the battery connected so that not only can the battery be charged but the device can be used while the battery is charging. A problem arises however if the battery is completely discharged since, when the charger is connected and starts to charge the battery, the supply voltage appearing at the user device is too low for the user device to function until the battery has charged partially and remains too low for an inconveniently long time. This can be particularly troublesome in the case of a portable telephone, for example, if the delay is of the order of minutes when the user desires to make an emergency call.

It is possible to provide control circuits which control the voltage and current supplied by the voltage generator and provide a parallel path for charging the battery. However these control circuits have involved a substantial additional cost.

It is desirable to provide a power supply with control circuits enabling the voltage generator to power the user device even in the presence of a completely discharged battery with a smaller, or no additional cost compared to voltage supplies without such a 'dead battery capability'.

SUMMARY OF THE INVENTION

The present invention provides a power supply apparatus and portable radio communication apparatus as described in the accompanying claims.

BRIEF DESCRIPTION OF THE DRAWINGS

FIG. 4 is a table showing the functional states of control elements in the apparatus of FIG. 2 in different operational conditions of the apparatus, using the graphic representations of FIG. 3.

DETAILED DESCRIPTION OF THE PREFERRED EMBODIMENTS

Figure 1:
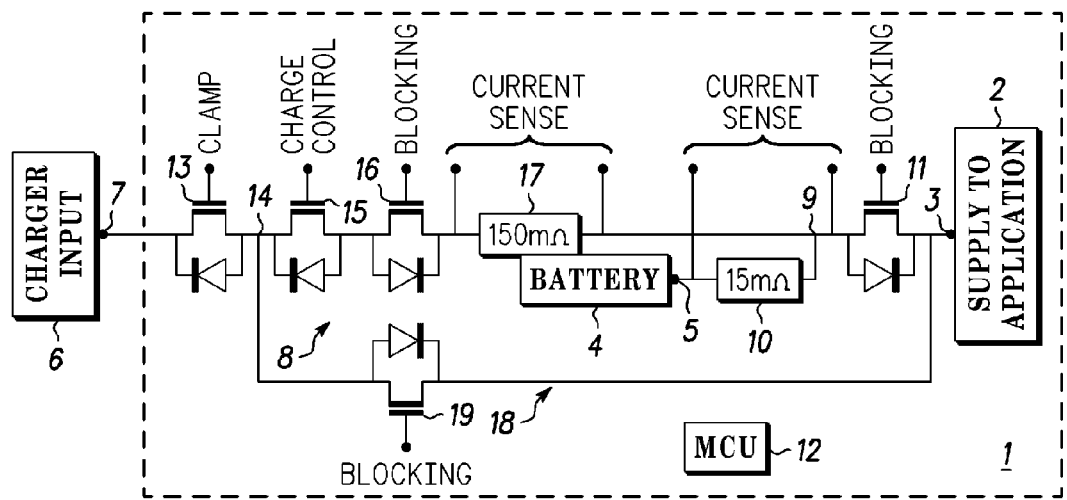
FIG. 1 is a schematic diagram of a known power supply apparatus in a portable radio telephone.

FIG. 1 shows a portable radio communication apparatus, in this example a portable radio telephone 1. The portable telephone 1 comprises a communication module including active signal processing, memory and audio circuits forming a load 2 energised by a power supply applying a voltage to a terminal 3 of the load. The power supply includes a rechargeable battery 4 connected to a terminal 5 for supplying power to the load 2 during normal usage of the telephone 1.

The power supply also comprises a charger 6 in the form of a voltage generator that may be connected to a terminal 7 of the telephone 1 to charge the battery 4 and, if necessary, to power the load 2. Typically, the charger is an AC/DC converter but it may alternatively be a DC/DC transformer, for example. The charger 6 supplies power to the battery 4 along a charging path 8 to a connection point 9 connected with the battery terminal 5 through a current sensing resistor 10. The connection point 9 is connected to the load terminal 3 through a blocking control element 11 whose function is described below. The control element and other control elements described below are operated under the control of microcontroller unit 12.

The charger terminal 7 is connected to the charging path 8 in series through a clamp control element 13 to a connection point 14. The charging path 8 then includes in series a charge control element 15, a reverse current blocking control element 16 and a current sense resistor 17.

The control elements are discrete field-effect transistors ('FETs') and, in this example are unidirectional FETs. As illustrated by the symbol of a diode, the FETs allow a parasitic current to flow even when subjected to a reverse voltage.

In operation, with the charger 6 disconnected, the battery 4 supplies power through the current sensing resistor 10 and the blocking control element 11 to the terminal 3 and the load 2, the blocking control element 11 being biased to a conducting state by the MCU 12.

When the charger 6 is connected, in normal charging conditions, the charger supplies power through the charging path 8 to the connection point 9, the charging current being controlled by the MCU through the charge control element 15 in dependence on the voltages and currents sensed.

If the charger 6 is connected to the terminal 7 before being energised and power is then applied, the voltage at the terminal 7 can be excessive. This condition is monitored by the MCU 12 and regulated through the clamp control element 13.

If the charger is unplugged (de-energised) while still connected to the terminal 7 with the battery 4 charged, the MCU 12 switches the reverse current blocking control element 16 to a non-conductive state to prevent the flow of reverse current into the charger 6.

If the battery 4 is at a low state of charge, the charger 6 is able to supply sufficient power to operate the active circuits of the load 2. However, if the state of charge of the battery 4 is too low, the charger cannot raise the voltage at the terminal 3 to a sufficient level to operate the active circuits of the load 2 until the battery 4 has charged at least partially; this can take several minutes, during which time the telephone is unusable. Accordingly, a supply path 18 is provided in parallel with the charging path 8 to enable the charger 6 to supply power directly to the terminal 3 and the load 2. A blocking control element 19 is connected in series in the parallel path 18 and the MCU 12 normally maintains the blocking control element 19 non-conducting and the blocking control element 11 conducting so that the power supply and charging currents from the charger 6 pass along the path 8 and are controlled by the control elements 15 to 17. However, when the MCU 12 senses that the battery voltage is too low, it makes the blocking control element 19 conducting and the blocking control element 11 non-conducting, so that the charger 6 supplies power to the terminal 3 and the load 2 along the path 18 and the battery 4 is disconnected from the terminal 3 so as not to drag down the voltage at the terminal while the battery is still discharged.

The voltage supply apparatus shown in FIG. 1 fulfils the basic function of enabling the charger 6 to power the load 2 with a dead battery 4 or with the battery 4 removed but it requires 5 discrete control components, which adds cost to the telephone, and in addition, these components occupy space on the circuit board, which further increases the cost of ensuring dead battery operation.

The voltage supply apparatus of the embodiment of the present invention is able to provide dead or missing battery operation with fewer components, comparable with the number of components in a telephone incapable of dead battery operation, so that the dead or missing battery operation feature involves substantially no on-cost.

Figure 2:
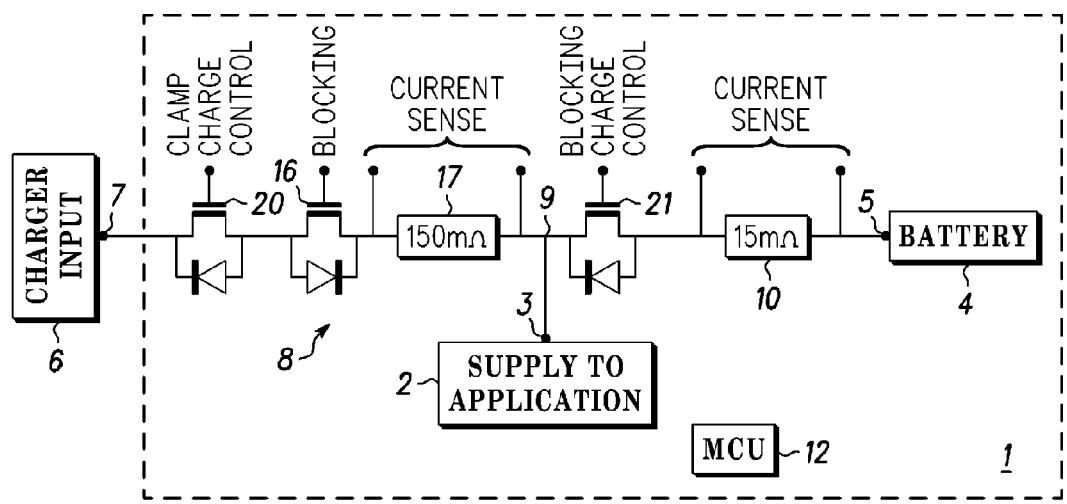
FIG. 2 is a schematic diagram of a power supply apparatus in a portable radio telephone, in accordance with one embodiment of the invention, given by way of example.

In FIG. 2, elements that are similar to those of FIG. 1 bear similar reference numbers. The charger terminal 7 is connected to the connection point 9 through a charging path 8. The load terminal 3 is connected directly to the connection point 9. The MCU 12 controls the charging current in, and the voltage applied to the path 8 through a clamp and charge control element 20 in series in the path 8, reverse current being controlled by the blocking element 16. A blocking and charge control element 21 is connected in series with the current sense resistor 10 between the battery terminal 5 and the connection point 9.

The charging clamp and charge control element 20 and the battery clamp and charge control element 21 are controlled by the MCU 12 to present a high impedance, non-conductive state or a low impedance, conductive state or a controlled impedance state in which their impedance is controlled as a function of the sensed current and/or voltage variables so as to control the magnitude of the currents they supply.

In operation, with the charger 6 disconnected, the battery 4 supplies power through the blocking control element 21 and the current sensing resistor 10 to the terminal 3 and the load 2, the blocking control element 21 being biased to a conducting state by the MCU 12.

When the charger 6 is connected, in normal charging conditions, the charger supplies power through the charging path 8 to the connection point 9, the charging current being controlled by the MCU through the charge control elements 20 and 21 in dependence on the voltages and currents sensed. The proportion of current supplied to the battery 4 instead of the load 2 is controlled by the charge control element 21.

If the charger 6 is connected to the terminal 7 before being energised and power is then applied, the voltage at the terminal 7 is regulated by the MCU 12 through the clamp control element 20.

If the charger is unplugged (de-energised) while still connected to the terminal 7 with the battery 4 charged, the MCU 12 switches the reverse current blocking control element 16 to a non-conductive state to prevent the flow of reverse current into the charger 6.

If the battery 4 is at a low state of charge, the charger 6 is able to supply sufficient power to operate the active circuits of the load 2. However, if the state of charge of the battery 4 is too low, the blocking and charge control element 21 connected in series between the battery terminal 5 and the connection point 9 is rendered non-conducting by the MCU 12, so that the charger 6 supplies power to the terminal 3 and the load 2 with the battery 4 disconnected from the connection point 9 so as not to drag down the voltage at the terminal if the battery is totally discharged; the battery can charge over the path 8 even while the charger 6 supplies power to the load 2 if the charger power supply is sufficient, the MCU 12 putting the blocking and charge control element 21 in an intermediate impedance state such that the voltage at the connection point 9 and the load terminal 3 is higher than the voltage at the battery terminal 5.

When the battery 4 is partially charged to a battery voltage less than full charge, the telephone can be used with power supplied from the charger 6 over the path 8 while the battery is charging. The MCU 12 puts the clamp and charge control element 20 and the blocking and charge control element 21 in the intermediate, controlled impedance state or a fully conductive state, according to the power supply conditions so that the charger 6 supplies appropriate current both to the battery and to the load.

In one embodiment of the invention, when the battery 4 reaches full charge, the MCU 12 puts the clamp and charge control element 20 into its non-conductive state, so as to disconnect the charger 6 from the load 2 and the battery 4.

In another embodiment of the invention, when the battery 4 is at full charge with the charger connected, the MCU 12 puts the blocking and charge control element 21 into its non-conductive state, so as to disconnect the battery 4 from the load 2 and the charger 6, so as to leave the battery 4 in its fully charged condition during use of the telephone.

The control elements 16 and 20 are preferably FETs and preferably unidirectional FETs. However, the control element 20 may be a bidirectional FET. It is also possible for the blocking control element 16 to be a diode. The control element 21 is preferably a unidirectional FET.

Figure 3:
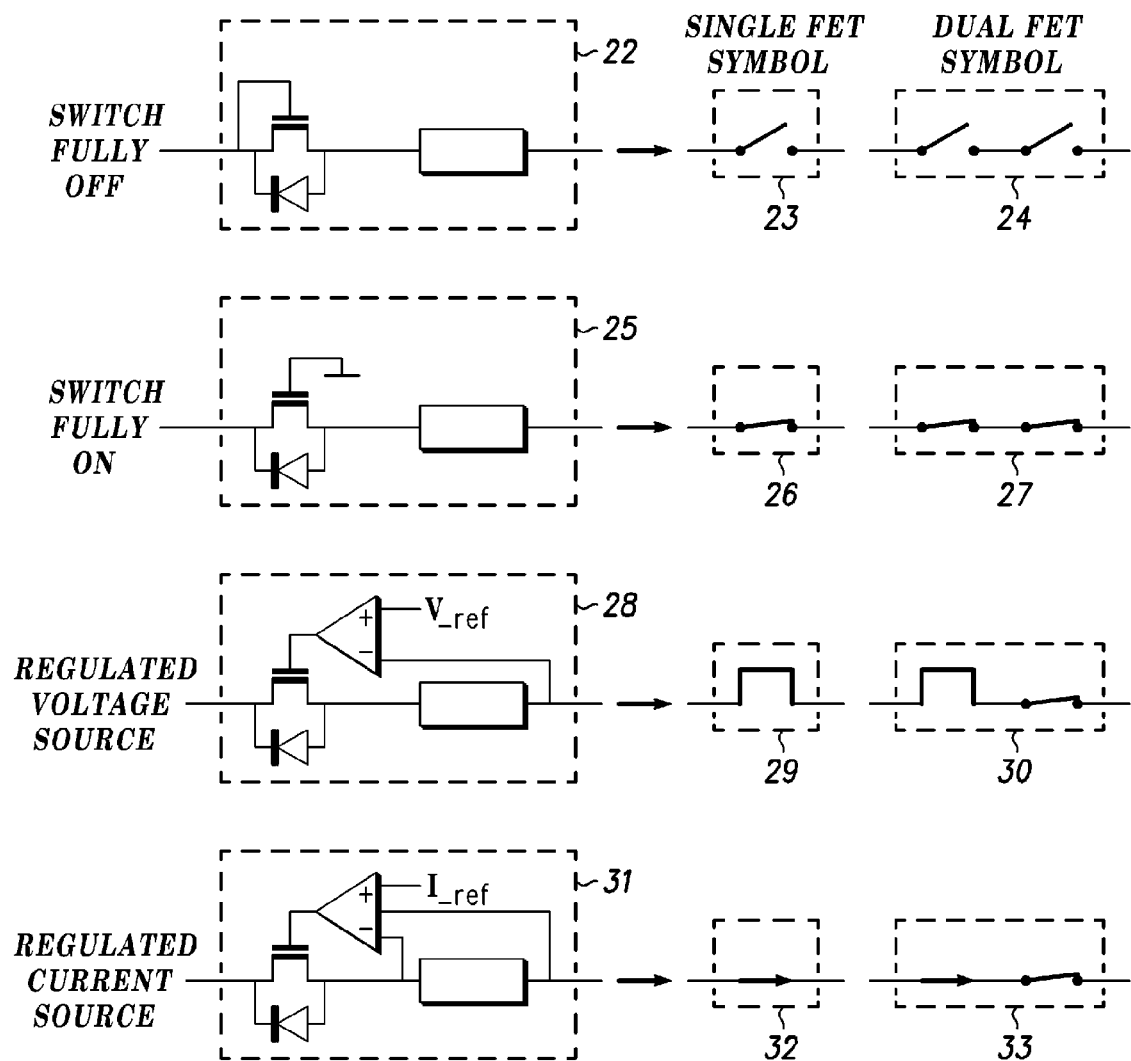
FIG. 3 is a table showing graphic representations of control elements in the apparatus of FIG. 2 in different functional states.

The operation of this embodiment of the invention will now be described in more detail with reference to FIGS. 3 and 4 of the drawings. FIG. 3 shows the simplified symbols used in FIG. 4 to represent the different operational states of the control elements 16, 20 and 21, as shown by their equivalent circuit diagrams in FIG. 3. Thus, a control element 22 in a non-conductive state is represented as a single open switch in the case of a single FET 23 or a dual open switch in the case of a dual FET 24. A control element 25 in a fully conductive state is represented as a single closed switch in the case of a single FET 26 or a dual closed switch in the case of a dual FET 27. A control element 28 in a voltage regulating state is represented by a voltage limiting symbol in the case of a single FET 29 or a voltage limiting symbol in series with a closed switch in the case of a dual FET 30. A control element 31 in a current regulating state is represented by an arrow in the case of a single FET 32 or an arrow in series with a closed switch in the case of a dual FET 33.

FIG. 4 shows the operating states of the control elements 20, 16 and 21 for the cases of no charger connected, of a low power charger connected, capable of supplying the load while charging the battery when the load is operating in conditions of low current consumption, and of a high power charger connected, capable of supplying the load while charging the battery even when the load is operating in conditions of high current consumption. The operating states are shown for the conditions of no battery connected, of a depleted ('dead') battery, of a battery in low but normal uncharged condition, of a battery close to full charge, where the charger is to supply in 'top-off conditions, and of a full battery.

When no charger 6 is connected, the MCU 12 puts both the control elements 16 and 20 non-conductive and the control element 21 either non-conductive (A) if the load 2 is not being used or conductive (B) if it is.

When a low- or high-power charger 6 is connected, the MCU 12 puts the charging clamp and charge control element 20 in the voltage clamp state and the blocking element 16 conductive. If there is no battery 4 connected (C), the MCU 12 puts the control element 21 non-conductive. If the battery 4 is connected (D), the MCU 12 puts the control element 21 in current-regulated state to conduct 'trickle' current, enabling the load 2 to operate at full voltage while still charging the battery 4, albeit slowly.

When a low-power charger 6 is connected with an at least partially charged battery 4 connected, the MCU 12 puts the control element 20 in current-regulated state, with the blocking element 16 conductive, for a normally low battery (E), the current being reduced by the control element 20 during 'top-off' when the battery 4 is close to full charge (G); in each case, the control element 21 is conductive so that the battery 4 can charge while the load 2 is operating under power supplied from the charger. When battery 4 is fully charged (I), the MCU 12 puts the control element 20 and the blocking element 16 non-conductive, the control element 21 being conductive so that the battery 4 supplies the load 2.

When a high-power charger 6 is connected with an at least partially charged battery 4 connected, the MCU 12 puts the control element 20 in current-regulated state, with the blocking element 16 conductive, for a normally low battery (F), the current being reduced by the control element 21 during 'top-off' when the battery 4 is close to full charge (H), in which case, the control element 20 is in voltage-regulation state. When battery 4 is fully charged (J), the MCU 12 puts the control element 21 non-conductive, the control element 21 being in voltage-regulation state and the blocking element 16 being conductive so that the charger 6 supplies the load 2 and preserves the charge of the battery 4.

The invention claimed is:

1. Power supply apparatus for supplying a direct voltage to a load that is connected to a first terminal, the supply apparatus comprising:
   a rechargeable battery for connection to a second terminal, and a voltage generator for recharging said battery and supplying power to said load;
   first control means for controlledly supplying current from said voltage generator to said first terminal so as to control supply of current from said voltage generator to said load and for preventing reverse flow of current from said first terminal to said voltage generator, said first control means being arranged to present selectively a high impedance state, a low impedance state or a controlled current state, said controlled current state controlling the magnitude of the current supplied by said first control means to said load; and
   second control means for controlledly supplying current between said first and second terminals so as to control supply of current from said voltage generator through said first control means to said battery and from said battery to said load.

2. Power supply apparatus for supplying a direct voltage to a load that is connected to a first terminal, the supply apparatus comprising:
   a rechargeable battery for connection to a second terminal, and a voltage generator for recharging said battery and supplying power to said load;
   first control means for controlledly supplying current from said voltage generator to said first terminal so as to control supply of current from said voltage generator to said load and for preventing reverse flow of current from said first terminal to said voltage generator; and
   second control means for controlledly supplying current between said first and second terminals so as to control supply of current from said voltage generator through said first control means to said battery and from said battery to said load;
   wherein said first and second control means are arranged to present selectively a high impedance state, a low impedance state or a controlled impedance state, said controlled impedance state controlling the magnitudes of the currents supplied by said first and second control means respectively.

3. Power supply apparatus as claimed in claim 2, wherein said second control means is responsive to the presence of a low battery voltage at said second terminal to present said controlled impedance state between said first and second terminals so as to apply a controlled voltage at said first terminal greater than said low battery voltage.

4. Power supply apparatus as claimed in claim 2, wherein said first and second control means are responsive to a battery voltage less than full charge to present said controlled impedance state so that said voltage generator supplies current both to said battery and to said load.

5. Power supply apparatus as claimed in claim 2, wherein said first control means is responsive to a battery voltage substantially equal to full charge to present said high impedance state so as to disconnect said voltage generator from said battery and said load.

6. Power supply apparatus as claimed in claim 3 wherein said second control means is responsive to a battery voltage substantially equal to full charge to present said high impedance state so as to disconnect said battery from said voltage generator and said load.

7. Power supply apparatus as claimed in claim 2 wherein said first and second control means comprise respective field-effect transistors and respective means for controlling said field-effect transistors to present selectively said high impedance state, said low impedance state or said controlled impedance state.

8. Power supply apparatus as claimed in claim 7 wherein said first control means comprises at least a first one of said field-effect transistors connected in series between said voltage generator and said first terminal for controlling supply of current from said voltage generator to said first terminal and an element connected in series between said voltage generator and said first terminal for preventing reverse flow of current from said first terminal to said voltage generator.

9. Power supply apparatus as claimed in claim 8 wherein said element comprises a second one of said field-effect transistors.

10. Portable radio communication apparatus comprising a communication module and power supply apparatus as claim 6 for supplying power to said communication module, said communication module forming at least part of said load.

11. Power supply control apparatus for controlling supply of a direct voltage and current between a voltage generator, a load that is connected to a first terminal, and a rechargeable battery that is connected to a second terminal, the supply control apparatus comprising:
    a first control circuit for controlledly supplying current from said voltage generator to said first terminal so as to control supply of current from said voltage generator to said load and for preventing reverse flow of current from said first terminal to said voltage generator, said first control circuit being arranged to present selectively a high impedance state, a low impedance state or a controlled current state, said controlled current state controlling the magnitude of the current supplied by said first control circuit to said load; and
    a second control circuit for controlledly supplying current between said first and second terminals so as to control supply of current from said voltage generator through said first control circuit to the battery and from the battery to said load.

12. Power supply control apparatus for controlling supply of a direct voltage and current between a voltage generator, a load that is connected to a first terminal, and a rechargeable battery that is connected to a second terminal, the supply control apparatus comprising:

a first control circuit for controlledly supplying current from said voltage generator to said first terminal so as to control supply of current from said voltage generator to said load and for preventing reverse flow of current from said first terminal to said voltage generator, said first control circuit being arranged to present selectively a high impedance state, a low impedance state or a controlled current state, said controlled current state controlling the magnitude of the current supplied by said first control circuit to said load; and a second control circuit for controlledly supplying current between said first and second terminals so as to control supply of current from said voltage generator through said first control circuit to the battery and from the battery to said load, wherein the first control circuit includes a first control element and a second control element.

13. Power supply control apparatus as claimed in claim 12, wherein the first control element is in series with the second control element.

14. Power supply control apparatus as claimed in claim 12, wherein the first control element includes a first transistor and the second control element includes a second transistor.

15. Power supply control apparatus as claimed in claim 11, wherein the second control circuit includes a control element.

16. Power supply control apparatus as claimed in claim 15, wherein the control element includes a transistor.

17. Power supply control apparatus as claimed in claim 15, wherein the control element includes a diode.

18. Power supply control apparatus for controlling supply of a direct voltage and current between a voltage generator, a load that is connected to a first terminal, and a rechargeable battery that is connected to a second terminal, the supply control apparatus comprising:

a first control circuit for controlledly supplying current from said voltage generator to said first terminal so as to control supply of current from said voltage generator to said load and for preventing reverse flow of current from said first terminal to said voltage generator; and a second control circuit for controlledly supplying current between said first and second terminals so as to control supply of current from said voltage generator through said first control circuit to the battery and from the battery to said load;

wherein said first and second control circuits are arranged to present selectively a high impedance state, a low impedance state or a controlled impedance state, said controlled impedance state controlling the magnitudes of the currents supplied by said first and second control circuit respectively.

19. Power supply control apparatus as claimed in claim 18, wherein said second control circuit is responsive to the presence of a low battery voltage at said second terminal to present said controlled impedance state between said first and second terminals so as to apply a controlled voltage at said first terminal greater than said low battery voltage.

20. Power supply control apparatus as claimed in claim 18, wherein said first and second control circuit are responsive to a battery voltage less than full charge to present said controlled impedance state so that said voltage generator supplies current both to the battery and to said load.

* * * * *